United States Patent Office 3,172,753
Patented Mar. 9, 1965

3,172,753
METHOD FOR THE PRODUCTION OF
FINELY-DIVIDED METALS
Robert J. Walsh, Dayton, Ohio, assignor to Monsanto
Company, a corporation of Delaware
No Drawing. Filed Jan. 3, 1961, Ser. No. 80,047
3 Claims. (Cl. 75—.5)

This invention relates to a method for the production of metals in very fine particulate forms.

The invention also relates to the production of intimate admixtures of elemental metals and oxides, the individual particles of which possess a spheroidal shape.

It is an object of this invention to provide pure forms of metals in the form of exceedingly small particles. It is a further object of the invention to provide a method for the production of combinations of elemental metals with their respective oxides, or different oxides, in finely divided intimate combination wherein the high degree of dispersion of the oxides relative to the metals yields a product useful in the manufacture of dispersion strengthened metals.

It has now been found that particulate compositions consisting of crystalline pure metals, or of combinations of metals with oxides dispersed therein may be prepared by atomizing a solution of salts of the desired metals into a reducing flame. This results in the production of a pure metal, or a combination of metal and oxide in accordance with the method described herein.

The metals contemplated in the present invention for production as free metal include nickel, silver, palladium, platinum, gold, copper, cobalt, iron, ruthenium, rhodium, osmium, iridium, lead, and tin.

The metallic compositions obtained in accordance with the procedure of the present invention exist as crystalline forms of the individual metals. The use of two or more components which are reduced to the metallic state makes it possible to obtain alloys and mixed crystals, which exist in the form of solid solutions, i.e., solid forms which exhibit physical properties differing from those of the component metals and/or oxides. The solid solutions are homogeneous and isomorphous, existing as various crystalline forms. In this way, it is possible to prepare alloys of any desired combination of metals.

The free metals produced by the process of the present invention may also be in combination with certain reinforcing oxides for use in the manufacture of dispersion strengthened metals. The oxides for this purpose include the oxides of aluminum, magnesium, titanium, zirconium, hafnium, thorium, cerium, neodymium, lanthanum, and praseodymium.

When one or more of the components is not completely reduced to the metallic form, but instead exists as oxide as in the case for the group listed above, such oxides occur as a separate phase in combination with the metal. For example, the oxide such as alumina may thus exist as a dispersed form in which the oxide is precipitated or dispersed in a metal, for example, metallic nickel.

Products obtained in accordance with the process of the present invention are of utility in a number of metallurgical processes. Thus, the above-described metal or metal-oxide products may be utilized in the manufacture of high purity alloys by powder metallurgy techniques and in the fabrication of high strength metals and alloys, taking advantage of the strengthening effect of the oxide dispersed in the base metal.

In forming the desired pure metal or combination of metal and oxide, solutions of the desired metal salts are prepared by dissolving suitable salts of these metals in water or in organic solvents, or in mixtures of these. For this purpose, the salts of the metals should be those which are readily soluble, or are rendered soluble by the use of acids or bases. The solubility of the salts in the solvent to be used can be readily ascertained by reference to the standard tables of solubility, or if these be lacking, by conducting simple solubility determinations in advance of the preparation of the solutions. Suitable solutions of salts may be prepared by employing the simple soluble salts of the desired metals, for example, nickel and aluminum, as the chloride, bromide, nitrate, sulfate and acetate, with preference being given to the chloride and sulfate by reason of their cheapness and availability. The chloride salts have also been found to produce the smallest-sized particles of the combination oxide and metal combinations. The concentration of the solution may be varied from that of extreme dilution, e.g., 1% solids, to concentrations approaching saturation. The concentration chosen will be dependent upon the state of fineness of the product desired. In general, dilute solutions employed in the process give smaller particles than do the more concentrated solutions and by making use of this fact, the particle size of the product is subject to a considerable degree of control. Other methods for controlling the particle size include the following: controlling the degree of atomization of the metal salt solution by regulating the rate of flow of the atomizing gas and the orifice size in the case of a pneumatic atomizing nozzle; and variation of the flame temperature by controlling the proportion of oxygen and the dilution of the reducing flame with inert gases such as nitrogen. In these methods, particles may be obtained less than 1100 Angstroms in diameter and, if desired, in the range of 200 to 800 Angstroms diameter.

The solvent should be chosen with regard to the particular metal salts which are available and the concentration of the salt desired which in turn is dependent upon the fineness of particle which is to be prepared. Considerable latitude may be exercised in regard to the solvent employed, since a great many solvents, in addition to water, are available from which a choice may be made. Foremost among the useful solvents are the lower alcohols, such as methyl, ethyl, propyl, isopropyl, butyl, isobutyl, and tertiary butyl alcohols. Ketones, such as acetone and methyl ethyl ketone or cyclic ethers, such as dioxane or related ethers may also be employed. The organic solvents are advantageously employed in the present flame oxidation method since they are also combustible and thus provide a heat source.

The present invention involves the atomization of the metal salt solution into a non-oxidizing flame. This includes a neutral (stoichiometrically complete reaction to $CO_2$ and $H_2O$) flame although the reducing flame having an incomplete combustion is preferred. The flame is produced by the combustion of combustible fluids employing air, oxygen, or mixtures thereof as oxidants. The combustible gases useful for this purpose are carbon monoxide, cyanogen, hydrogen, ammonia, methane, ethane, ethylene, propane, propylene, butane, or any of the solvents listed above as well as liquid hydrocarbons derived from petroleum or coal sources.

Although any of the commonly available types of spray nozzles may be used for atomizing the metal salt solution, a pneumatic atomizing nozzle has been found to be particularly effective in producing the fine, uniform dispersion or droplets which is desired.

When combustion occurs, the fuel gas and/or the solvent vapors are burned with a reducing flame to provide uniform heating and at the same time permit decomposition of the salts to the corresponding metals and oxides. The atomizing carrier gas may be any of the combustible gases such as those listed in the preceding paragraph, oxygen, or an oxygen-containing gas such as air, an inert gas such as nitrogen or steam or any mixtures of these gases. Fuel for combustion is supplied in the amount required to heat the mixture to decomposition temperature and to obtain a flame temperature of from 800° C. to 2000° C., a preferred range being from 1000° C. to 1600° C. for a period of time of 1 second to 0.001 second, a preferred range being from 0.1 second to 0.01 second. It is obvious that the individual particles undergoing reaction may not reach as high a temperature as that of the flame, although it is desirable to measure the flame temperature as the most convenient method of control.

The particles leaving the combustion zone are cooled by direct or indirect heat exchange and are then collected by suitable means such as water scrubbers, wet or dry cyclone separators, electrostatic precipitators, or bag filters.

The reducing flame is established in any suitable manner and into this flame is then atomized the solution of salts. This atomization of the solution is effected by employing any standard atomizing nozzle, the same being so arranged that the atomized "mist" of solution is projected into the flame. The solution of metal salts may be atomized by employing liquid pressure, or it may be atomized by the use of part of the oxidizing gas or by using the combustible gas. One convenient way to do this involves the use of a pneumatic atomizing nozzle consisting of a compound nozzle structure provided with separate adjacent peripheral ports through which the respective combustible gases or vapors and the solution are supplied.

The flame temperature obtained during combustion will depend upon the relative proportions of combustible gas, inert gas and atomized solution of salts fed into the flame and should be so controlled that the final product is burned substantially free of foreign chemical elements (other than the metal and metal oxide) which constituted the salts fed to the flame. For example, if the metal salts are the chlorides of nickel and aluminum, the product should be free of chlorides. This point is readily ascertained by simple chemical test. If traces of such residual anion are present in the product, it will be realized that the temperature was not sufficiently high and measures may then be taken so as to increase the flame temperature to eliminate the chloride (or other element) in the products.

Another way in which certain stable metals can be "burned" free of undesired residual starting elements or compounds is to increase the residence time during the heating step. This can be done by adjusting the size of the flame, and insulating the heating conduit so that the particles are maintained at elevated temperatures for a longer period of time. By suitably proportioning the flame chamber having due regard to the temperature therein, the product can be made substantially free of undesired elements or compounds.

The following examples illustrate specific embodiments of the present invention.

*Example 1*

The preparation of nickel metal is shown in the following example. The feed solution was prepared by dissolving one pound of nickel sulfate, $NiSO_4 \cdot 6H_2O$, in two pounds of water. This solution was fed into an atomizing nozzle at the rate of one pound per hour using natural gas as the atomizing gas supplied at the rate of 5.7 lb./hr. The preheat nozzle was supplied with 1.56 lb./hr. of natural gas, the total feed to the vertical combustion tower being 7.3 lb./hr., and the air feed totalling 119.1 lb./hr. to give a reducing flame.

The introduction of the solution of the salt in solution resulted in the rapid atomization of the solution and the decomposition of the salt, with the result that under the reducing conditions present in the flame, the product contained a substantial proportion of free metal. The flame from the burner was passed downward through a cooling and collection zone in which the hot combustion products were cooled by direct injection from water sprays. The finely divided oxide product was scrubbed from the gas stream by the cooling water sprays and withdrawn as a slurry. The powder was then isolated by decantation and filtration to yield the metal as a finely divided powder.

When the product was examined under the electron microscope, the powder product was found to be composed principally of spheroidal particles averaging about 2 microns diameter.

*Example 2*

The preparation of silver metal is shown in the following example. The feed solution was prepared by dissolving 0.44 lb. of silver nitrate, $AgNO_3$, in 0.44 lb. of distilled water. This solution was fed into an atomizing nozzle at the rate of 1.88 lb./hr. using natural gas as the atomizing gas supplied at the rate of 5.58 lb./hr. The pilot nozzle was supplied with 2.32 lb./hr. of natural gas, the total feed to the vertical combustion tower being 7.90 lb./hr., and the air feed adjusted to give a reducing flame.

The introduction of the solution of the salt into the flame resulted in the rapid atomization of the solution and the decomposition of the salt, with the result that under the reducing conditions present in the flame, the product was entirely the free metal, which was 100% crystalline (crystillite size, 0.13 micron). The flame from the burner was passed downward through a cooling and collection zone in which the hot combustion products were cooled by direct injection from water sprays. The finely divided metal product was scrubbed from the gas stream by the cooling water sprays and withdrawn as a slurry. The powder was then isolated by decantation and filtration to yield the metal as a finely divided powder.

When the product was examined under the electron microscope, the powder product was found to be composed of spheroidal particles of from 0.03 to 0.6 micron diameter, averaging 0.25 micron.

*Example 3*

The preparation of an alloy of silver and palladium is shown in the following example. The feed solution was prepared by dissolving 0.33 lb. of silver nitrate and 0.69 lb. of palladium nitrate in 1.03 lb. of water and 2.05 lb. of 70% nitric acid. This solution was fed into an atomizing nozzle at the rate of 7.3 lb./hr. using natural gas as the atomizing gas supplied at the rate of 5.87 lb./hr. The pilot nozzle was supplied with 2.24 lb./hr. of natural gas, the total feed to the vertical combustion tower being 8.11 lb./hr., and the air feed totalling 193.6 lb./hr. was adjusted to give a reducing flame.

The introduction of the solution of the salt in solution resulted in the rapid atomization of the solution and the decomposition of the salts with the result that under the reducing conditions present in the flame, the product was predominantly the free metal. The flame from the burner was passed downward through a cooling and collection zone in which the hot combustion products were cooled by direct injection from water sprays. The finely divided metal product was scrubbed from the gas stream by the cooling water sprays and withdrawn as a slurry. The powder was then isolated by decantation and filtration to yield the metal as a finely divided powder containing 98% of the elemental metals as an alloy (42.5% Ag and 57.5% Pd).

When the product was examined under the electron microscope, the powder product was found to be composed of spheroidal particles of from 0.15 to 0.015 microns diameter, averaging 0.08 micron.

*Example 4*

The preparation of copper metal is shown in the following example. The feed solution was prepared by dissolving 9.42 pounds of copper sulfate, $CuSO_4 \cdot 5H_2O$ in 40.7 pounds of water. This solution was fed into an atomizing nozzle at the rate of 13.8 lb./hr. using natural gas as the atomizing gas supplied at the rate of 5.65 lb./hr. The preheat nozzle was supplied with 2.30 lb./hr.

of natural gas, the total feed to the vertical combustion tower being 7.95 lb./hr., and the air feed was adjust to give a reducing flame.

The introduction of the solution of the salt in solution resulted in the rapid atomization of the solution and the decomposition of the salt, with the result that under the reducing conditions present in the flame, the product contained substantial amounts of free copper. The flame from the burner was passed downward through a cooling and collection zone in which the hot combustion products were cooled by direct injection from water sprays. The finely divided metal product was scrubbed from the gas stream by the cooling water sprays and withdrawn as a slurry. The powder was then isolated by decantation and filtration to yield the metal as a finely divided powder.

When the product was examined under the electron microscope, the powder product was found to be composed principally of spheroidal particles of from 0.25 to 10 microns diameter, averaging about 4 microns diameter. The crystallite size was estimated by X-ray diffraction to be 0.1 micron.

*Example 5*

The preparation of a mixture of platinum metal and cerium oxide is shown in the following example. The feed solution was prepared by disolving 8 lb. of chloroplatinic acid (40% platinum) and 0.224 lb. of cerium chloride, $CeCl_3 \cdot 6.5H_2O$, in 13.8 lb. of water. This solution was fed into an atomizing nozzle at the rate of 3.5 lb./hr. using natural gas as the atomizing gas supplied at the rate of 6 lb./hr. The pilot nozzle was supplied with 2.2 lb./hr. of natural gas, the total feed to the vertical combustion tower being 8.2 lb./hr. The air feed was adjusted to give a reducing flame.

The introduction of the solution of the salt in solution resulted in the rapid atomization of the solution and the decomposition of the salts with the result that under the reducing conditions present in the flame, the product was a mixture containing 96.8% elemental platinum and 2.94% $CeO_2$. The flame from the burner was passed downward through a cooling and collection zone in which the hot combustion products were cooled by direct injection from water sprays. The finely divided metal product was scrubbed from the gas stream by the cooling water sprays and withdrawn as a slurry. The powder was then isolated by decantation and filtration to yield the metal as a finely divided powder.

When the product was examined under the electron microscope, the powder product was found to be composed of spheroidal particles of from 0.01 to 0.1 micron diameter, averaging 0.04 micron. The crystallite size was found to be 0.09 and 0.02 micron for the platinum and the ceric oxide, respectively. The surface area (BET nitrogen adsorption) was 6.6 sq. m./gm.

*Example 6*

The preparation of free lead having magnesium oxide dispersed therein is shown in the following example. The feed solution was prepared by dissolving 76 pounds of lead nitrate, $Pb(NO_3)_2$, and 3.8 pounds of $Mg(NO_3)_2 \cdot 6H_2O$, magnesium nitrate, in 210 pounds of water. This solution was fed into an atomizing nozzle at the rate of 73 lb./hr. using natural gas as the atomizing gas. The total gas feed to the vertical combustion tower being 73.8 lb./hr., and the air feed totalling 1042 lb./hr. to give a reducing flame.

The introduction of the solution of the salt in solution resulted in the rapid atomization of the solution and the decomposition of the salt, with the result that under the reducing conditions present in the flame, the product contained substantial quantities of elemental lead with 1% MgO dispersed in the metal. The flame from the burner was passed downward through a cooling and collection zone in which the hot combustion products were cooled by direct injection from water sprays. The finely divided product was scrubbed from the gas stream by the cooling water sprays and is withdrawn as a slurry. The powder was then isolated by decantation and filtration to yield the metal as a finely divided powder.

When the product was examined under the electron microscope, the powder product was found to be composed of particles of from 0.05 to 1.5 microns size, averaging 0.8 micron.

What is claimed is:

1. Method for the production of finely divided elemental metals selected from the group consisting of nickel, silver, palladium, platinum, gold, copper, cobalt, iron, ruthenium, rhodium, osmium, iridium, lead, and tin, which comprises dispersing a solution of salts of the said metals into a reducing flame containing carbon dioxide and water vapor at a temperature of from 800° C. to 2000° C. for a period of time of one second to 0.001 second, and therein decomposing the said salts to elemental metallic form, and collecting the said elemental metals as finely divided particles.

2. Method for the production of finely divided elemental metals selected from the group consisting of nickel, silver, palladium, platinum, gold, copper, cobalt, iron, ruthenium, rhodium, osmium, iridium, lead, and tin which comprises finely dispersing a solution of salts of the said metals into a flame containing carbon dioxide and water vapor at a temperature of from 800° C. to 2000° C. for a period of time of one second to 0.001 second, and therein decomposing the said salts and reducing the same to the elemental metallic form in the flame, and collecting the said elemental metals.

3. A process for producing a particulate composition consisting essentially of a metal and a metallic oxide in combined form and of spheroidal shape selected from the group consisting of nickel, silver, palladium, platinum, gold, copper, cobalt, iron, ruthenium, rhodium, osmium, iridium, lead, and tin, which comprises finely dispersing a solution of salts of the said metal component and the said metallic oxide component into a flame containing carbon dioxide and water vapor at a temperature of from 800° C. to 2000° C. for a period of time of one second to 0.001 second, and therein decomposing the said salts, and reducing the first said metal component to the elemental metal form, while maintaining the oxide component in the oxide form, and thereafter collecting the resulting product.

References Cited in the file of this patent

UNITED STATES PATENTS

| 1,836,732 | Schlecht et al. | Dec. 15, 1931 |
| 2,935,394 | Hiler | May 3, 1960 |
| 2,965,474 | Sargent et al. | Dec. 20, 1960 |

FOREIGN PATENTS

| 921,861 | France | May 21, 1947 |
| 393,092 | Great Britain | June 1, 1933 |
| 161,012 | Australia | Feb. 9, 1955 |